United States Patent [19]

Imaizumi et al.

[11] 4,082,817

[45] Apr. 4, 1978

[54] PROCESS FOR PRODUCING MALEIC ANHYDRIDE ADDUCT OF HIGH MOLECULAR WEIGHT 1,2-POLYBUTADIENE

[75] Inventors: Fumitake Imaizumi; Isao Nagaoka; Mitsuo Kurokawa, all of Yokohama; Koei Komatsu, Tokyo, all of Japan

[73] Assignee: Japan Synthetic Rubber Co., Ltd., Tokyo, Japan

[21] Appl. No.: 671,147

[22] Filed: Mar. 29, 1976

Related U.S. Application Data

[63] Continuation-in-part of Ser. No. 554,151, Feb. 28, 1975, abandoned.

[30] Foreign Application Priority Data

Mar. 2, 1974 Japan .................................. 49-24478

[51] Int. Cl.² .................................................. C08F 8/46
[52] U.S. Cl. ...................................... 260/879; 526/46; 526/56

[58] Field of Search ......................... 260/879; 526/56

[56] References Cited

U.S. PATENT DOCUMENTS

| 3,567,691 | 3/1971 | van Breen ........................... 260/879 |
| 3,689,446 | 9/1972 | Furuya et al. ................... 260/23.7 R |

Primary Examiner—William F. Hamrock
Attorney, Agent, or Firm—Oblon, Fisher, Spivak, McClelland & Maier

[57] ABSTRACT

A process for producing a maleic anhydride adduct of high molecular weight 1,2-polybutadiene by contacting with heat maleic anhydride with high molecular weight 1,2-polybutadiene in the absence of a radical initiator in a halogenated aromatic hydrocarbon solvent. The adduct obtained by this process has a high molecular weight of more than 10,000 and is quite free from gel. Said process enables the addition of maleic anhydride in any desired proportion.

12 Claims, No Drawings

PROCESS FOR PRODUCING MALEIC ANHYDRIDE ADDUCT OF HIGH MOLECULAR WEIGHT 1,2-POLYBUTADIENE

CROSS-REFERENCES TO RELATED APPLICATIONS

This application is a continuation-in-part of application Ser. No. 554,151, filed on Feb. 28, 1975, now abandoned.

This invention relates to a process for adding maleic anhydride (hereinafter referred to as MAH) to a high molecular weight 1,2-polybutadiene having a high vinyl content in any desired proportion of the MAH.

In general, addition products of MAH to rubbery high molecular weight polymers such as polybutadiene, polyisoprene and the like have been applied to improve the physical properties of rubber, and neutralized addition products of MAH to low molecular weight diene polymers having a molecular weight of less than 10,000 have been utilized in electrodeposition coating compositions based on the fact that said neutralized addition products are water-soluble or water-dispersible.

High molecular weight 1,2-polybutadiene having a molecular weight of more than 10,000 obtained by a series of production methods as disclosed in, for example, Japanese Pat. Nos. 574,705; 574,706; 620,867; 620,868; 629,503; 640,457; 640,458; 640,460; 640,461; and 650,888, and the like, is a new substance different from general rubbery substances, and some of the new substances are thermoplastic and rather have properties close to resins. If it should be possible to add MAH or the like to such a high molecular weight 1,2-polybutadiene to introduce a polar group thereinto, the resulting polymer could be improved in adhesive property, hydrophilic property, tensile strength and the like as compared with the starting polymer. However, if the addition product contains a gel, the gel remains insoluble when the addition product is dissolved in any solvent, and hence, no homogeneous solution is obtained. Moreover, said addition product is inferior in compatibility with other polymers so that when it is used in adhesives or paints, the coating film formed is not smooth and is uneven. Therefore, a gel-free addition product has been desired.

In order to add 3 to 4 % by weight of MAH to rubbery high molecular weight polymers of butadiene or isoprene having a high cis-1,4 configuration content, the following methods are known and used: (1) a method by which the polymer and MAH are dissolved in an aliphatic or aromatic hydrocarbon solvent and the resulting solution is heated to add MAH to the polymer, (2) a method by which a radical initiator, such as azobisisobutyronitrile (AIBN), benzoyl peroxide (BPO) or the like is added to the solution formed in method (1) and the solution is then heated to add MAH to the polymer, and (3) a method by which the polymer is mixed with MAH directly by means of roll or mixer to add MAH to the polymer. For adding MAH to a liquid low molecular weight polymer having a molecular weight of less than 10,000, there has been used a method by which the polymer is blended with MAH in the absence of solvent and the resulting mixture is heated, or a method by which a radical initiator such as AIBN, BPO or the like is added to the mixture in the above method and the mixture is then heated.

When these methods, however, are applied to the addition of MAH to 1,2-polybutadiene having a high molecular weight, gelation is caused during the reaction in all the methods and it is impossible to produce a gel-free MAH adduct of the polymer. A liquid 1,2-polybutadiene having a low molecular weight can directly be mixed with MAH followed by heating to obtain an MAH adduct of the polymer (see, for example, U.S. Pat. No. 3,609,110 and British Pat. No. 1,206,796). However, with conventional high molecular weight substances, it is known that the higher the molecular weight, the higher the tendency of gelation because of the entanglement effect of molecule. When a high molecular weight 1,2-polybutadiene is mixed with MAH by means of a roll mill, gelation is also caused.

The present inventors have done extensive research on obtaining MAH adducts of a high molecular weight 1,2-polybutadiene, including one having a high vinyl content, quite free from gel to find that MAH can be added to the high molecular weight 1,2-polybutadiene even at a polymer concentration of 5 % by weight or more in any desired proportion of MAH without gelling by heating MAH and the polymer in the absence of a radical initiator in a halogenated aromatic hydrocarbon solvent as the reaction medium.

An object of this invention is to provide a method for producing an MAH adduct of a high molecular weight 1,2-polybutadiene.

Another object of this invention is to provide a method for producing the MAH adduct without causing gelation.

A further object of this invention is to provide a gel-free MAH adduct of a high molecular weight 1,2-polybutadiene.

Other objects and advantages of this invention will become apparent from the following description.

According to this invention, there is provided a process for producing an MAH adduct of high molecular weight 1,2-polybutadiene having a number average molecular weight of more than 10,000 and up to 200,000 and a crystallinity of up to 50 %, which comprises contacting MAH with said high molecular weight 1,2-polybutadiene at a reaction temperature of 50° to 260° C in the absence of a radical initiator in at least one halogenated aromatic hydrocarbon solvent thereby adding MAH to the polymer.

The term "number average molecular weight" used herein is defined to mean a number average molecular weight determined from the intrinsic viscosity ($[\eta]$) of the polymer using the following equation:

$$[\eta] = 9.1 \times 10^{-5} \times Mn^{0.8}$$

wherein $[\eta]$ is an intrinsic viscosity measured in toluene at 30° C and Mn is a number average molecular weight [see Y. Takeuchi, et al., "A New Thermoplastic Syndiotactic 1,2-Polybutadiene" in Coatings and Plastics Preprints, Vol. 34, No. 1, p. 123 (American Chemical Society) (April 1974)].

The 1,2-polybutadiene used in this invention has a high molecular weight, namely a number average molecular weight of more than 10,000 and up to 200,000, preferably 15,000 to 200,000, more preferably 20,000 to 100,000, and has a high vinyl content, such as 70 % or more, preferably 80 % or more. It may have a crystallinity of 5 to 50 %, preferably 10 to 40 % as measured by the density measurement method as disclosed in U.S. Pat. No. 3,852,225. The higher the molecular weight of the 1,2-polybutadiene, the more easy the gelation is to cause, and when the crystallinity of the 1,2-polybutadiene exceeds 50 %, the solubility thereof is reduced and gelation tends to occur.

The solvent used in this invention may be any halogenated aromatic hydrocarbon, including, for example, chlorobenzene, bromobenzene, iodobenzene, o-dichlorobenzene, m-dichlorobenzene, p-dichlorobenzene, o-chlorotoluene, m-chlorotoluene, m-chlorotoluene, p-chlorotoluene, α-chloronaphthalene, β-chloronaphthalene, o-boromtoluene, m-bromotoluene, p-bromotoluene, α-bromonaphthalene, and β-bromonaphthalene, though monochlorobenzene, dichlorobenzenes and α-chloronaphthalene are preferably used.

With halogenated aliphatic hydrocarbon solvents, gelation tends to take place, and with halogen-free organic solvents, gelation also tends to occur, and hence, it is difficult to obtain gel-free MAH adducts of high molecular weight 1,2-polybutadiene. In order to obtain a gel-free MAH adduct of high molecular weight 1,2-polybutadiene by use of a halogen-free organic solvent, it is necessary to effect the addition reaction at a very low polymer concentration, usually 1 % by weight or less. In this case, the reaction is very slow and the amount of MAH added to the polymer cannot be increased.

In the process of this invention, even when the concentration of the polymer dissolved in the halogenated aromatic hydrocarbon solvent is 10 % by weight, MAH can be added to the polymer without gelling, though the concentration is preferably 5 % by weight or less in view of ease of controlling the reaction temperature and the reaction time.

The reaction temperature is suitably 50° to 260° C, more preferably 150° to 260° C. When the reaction temperature does not reach 50° C, the reaction does not proceed, and when the temperature exceeds 260° C, gelation tends to occur.

The amount of MAH added to the polymer can be adjusted freely by varying the reaction temperature and the reaction time, and can be made as high as 10 to 40 % by weight, preferably 15 to 30 % by weight, based on the weight of the 1,2-polybutadiene. Therefore, even when the number average molecular weight of the starting 1,2-polybutadiene is more than 10,000, the addition product obtained can be made water-soluble by neutralizing the same with an alkali, such as lithium hydroxide, potassium hydroxide or the like.

The addition product obtained by the process of this invention has excellent adhesive property, high hydrophilic property, high tensile strength and the like. Therefore, the addition product of this invention can be used as adhesives and coating materials.

This invention is further explained in more detail below referring to Examples, which are not by way of limitation but by way of illustration. In the Examples, the gel content refers to the amount of residue on a wire net of 200 mesh when a 2 % by weight polymer solution in chloroform was filtered by means of said wire net.

EXAMPLE 1

In a pressure reaction vessel, 10 g of 1,2-polybutadiene having a vinyl content of 94 % as measured by the Morero method as disclosed in U.S. Pat. No. 3,852,225, a number average molecular weight (Mn) of 100,000 and a crystallinity of 25 % as measured by the density masurement method as disclosed in U.S. Pat. No. 3,852,225 was dissolved in 190 g of monochlorobenzene, 20 g of MAH was added thereto, and the resulting solution was stirred at 180° C for 10 hrs. under a nitrogen atmosphere. The reaction solution was thereafter added gradually to a large amount of methanol with stirring to precipitate the polymer. In order to remove the solvent completely, the polymer was reprecipitated from chloroform-methanol to purify the polymer, and then dried under reduced pressure. The difference between the weights of the polymer before and after the addition reaction was determined as the amount of MAH added to the polymer.

The polymer thus obtained was quite free from gel and the amount of MAH added to the polymer was about 10 % by weight.

EXAMPLE 2

The same procedure as in Example 1 was repeated, except that o-dichlorobenzene was substituted for the monochlorobenzene. The resulting polymer was quite free from gel, and the amount of MAH added to the polymer was about 10 % by weight.

EXAMPLE 3

The same procedure as in Example 1 was repeated, except that α-chloronaphthalene was substituted for the monochlorobenzene, the reaction temperature was 220° C, and the reaction time was 1 hr., 2 hrs., or 3 hrs.

The resulting polymer in each case was quite free from gel, and the amount of MAH added to the polymer was larger when the reaction time was longer.

COMPARATIVE EXAMPLE 1

The same procedure as in Example 1 was repeated, except that monochlorobenzene, o-dichlorobenzene or α-chloronaphthalene was used as the reaction medium, 0.2 g of azobisisobutyronitrile (AIBN) was added together with MAH, and the reaction was effected at 100° C for 30 min. In each case, the polymer gelled and precipitated.

COMPARATIVE EXAMPLE 2

The same procedure as in Example 1 as repeated, except that tetrahydronaphthalene, xylene, cyclohexane, hexyl chloride or octyl chloride was used as the reaction medium and the reaction was effected at 150° C. In each case, gelation was caused within 30 min. and the polymer precipitated.

COMPARATIVE EXAMPLE 3

The same procedure as in Example 1 was repeated, except that a mixed solvent of 80 % by volume of monochlorobenzene and 20 % by volume of xylene was used as the reaction medium and the reaction was effected at 180° C. Gelation was caused after 2 hrs. and the polymer precipitated.

The addition reaction conditions and the results in Examples 1 to 3 and Comparative Examples 1 to 3 are tabulated as in Table 1.

Table 1

| | Solvent | Radical initiator (AIBN) | Reaction temperature (°C) | Reaction time (hr.) | Amount of MAH added to the polymer (wt %) |
|---|---|---|---|---|---|
| Example 1 | Monochlorobenzene | — | 180 | 10 | 10 |
| Example 2 | o-Dichlorobenzene | — | 180 | 5 | 10 |
| Example 3 | α-Chloronaphthalene | — | 220 | 1 | 10 |
| | | | | 2 | 20 |
| | | | | 3 | 25 |
| Comparative Example 1 | Monochlorobenzene | Added | 100 | 1 | — (Gelled) |
| | o-Dichlorobenzene | Added | 100 | 1 | — (Gelled) |
| | α-Chloronaphthalene | Added | 100 | 1 | — (Gelled) |
| Comparative Example 2 | Tetralin | — | 150 | <0.5 | — (Gelled) |
| | Xylene | — | 150 | <0.5 | — (Gelled) |
| | Cyclohexane | — | 150 | <0.5 | — (Gelled) |
| | Hexyl chloride | — | 150 | <0.5 | — (Gelled) |
| | Octyl chloride | — | 150 | <0.5 | — (Gelled) |
| Example 3 | Monochlorobenzene 80 % / Xylene 20 % | — | 180 | 2 | — (Gelled) |

EXAMPLE 4

The same procedure as in Example 1 was repeated, except that various 1,2-polybutadienes as shown in Table 2 and the reaction conditions as shown in Table 2 were used to obtain the results shown in Table 2. The addition products obtained were neutralized with lithium hydroxide, and the water-solubility of the neutralized products was determined.

Table 2

| 1,2-Polybutadiene | | | | | | Amount of MAH added to the polymer (wt. %) | |
|---|---|---|---|---|---|---|---|
| Vinyl content (%) | Crystallinity (%) | Number average molecular weight (Mn) | Solvent | Reaction temp. (°C) | Reaction time (hr) | | Water solubility |
| 85 | 15 | 80,000 | α-Chloronaphthalene | 220 | 3 | 22 | Soluble |
| 85 | 25 | 100,000 | α-Chloronaphthalene | 220 | 3 | 23 | Soluble |
| 87 | 30 | 15,000 | Monochlorobenzene | 220 | 3 | 21 | Soluble |
| 81 | 40 | 37,000 | α-Chloronaphthalene | 205 | 4.5 | 23 | Soluble |
| 80 | 0 | 150,00 | α-Chloronaphthalene | 220 | 3 | 25 | Swellable |

What is claimed is:

1. A process for producing a virtually gel free maleic anhydride adduct of high molecular weight 1,2-polybutadiene having a number average molecular weight of more than 10,000 and up to 200,000 and a crystallinity of up to 50%, consisting essentially in contacting maleic anhydride with said high molecular weight 1,2-polybutadiene at a reaction temperature of 50° to 260° C in the absence of a radical initiator in at least one halogenated aromatic hydrocarbon solvent thereby adding maleic anhydride to the polymer, the concentration of the polymer dissolved in the halogenated aromatic hydrocarbon being up to 10% by weight.

2. A process according to claim 1, wherein the 1,2-polybutadiene has a molecular weight of 15,000 to 200,000.

3. A process according to claim 1, wherein the 1,2-polybutadiene has a molecular weight of 20,000 to 100,000.

4. A process according to claim 1, wherein the 1,2-polybutadiene has a vinyl content of 80 % or more.

5. A process according to claim 1, wherein the 1,2-polybutadiene has a crystallinity of 5 to 50 %.

6. A process according to claim 1, wherein the 1,2-polybutadiene has a crystallinity of 10 to 40 %.

7. A process according to claim 1, wherein the solvent is at least one member selected from the group consisting of chlorobenzene, bromobenzene, iodobenzene, o-dichlorobenzene, m-dichlorobenzene, p-dichlorobenzene, o-chlorotoluene, m-chlorotoluene, p-chlorotoluene, α-chloronaphthalene, β-chloronaphthalene, o-bromotoluene, m-bromotoluene, p-bromotoluene, α-bromonaphthalene, and β-bromonaphthalene.

8. A process according to claim 1, wherein the solvent is monochlorobenzene, dichlorobenzene or α-chloronaphthalene.

9. A process according to claim 1, wherein the concentration of the polymer in the solvent is 5 % by weight or less.

10. A process according to claim 1, wherein the reaction temperature in 150° to 260° C.

11. A process for producing a virtually gel-free maleic anhydride adduct of high molecular weight 1,2-polybutadiene having a number average molecular weight of 15,000 to 200,000, a vinyl content of at least 70%, and a crystallinity of up to 50%, consisting essentially in contacting maleic anhydride with said high molecular weight 1,2-polybutadiene at a reaction temperature of 150° to 260° C in the absence of a radical initiator while the polymer is dissolved in at least one halogenated aromatic hydrocarbon solvent at a concentration of 10% by weight or less, said solvent being selected from the group consisting of chlorobenzene, bromobenzene, iodobenzene, o-dichlorobenzene, m-dichlorobenzene, p-dichlorobenzene, o-chlorotoluene, m-chlorotoluene, p-chlorotoluene, alpha-chloronaphthalene, beta-chloronaphthalene, o-bromotoluene, m-bromotoluene, p-bromotoluene, alpha-bromonaphthalene and beta-bromonaphthalene, thereby adding maleic anhydride to the polymer.

12. A process for producing a virtually gel-free maleic anhydride adduct of high molecular weight 1,2-polybutadiene having a number average molecular weight of 20,000 and 100,000 a vinyl content of at least 80%, and a crystallinity of 10 to 40% consisting essentially on contacting maleic anhydride with said high molecular weight 1,2-polybutadiene at a reaction temperature of 150° to 260° C in the absence of a radical initiator while the polymer is dissolved in at least one halogenated aromatic hydrocarbon solvent at a concentaton of about 5% or less, said solvent being selected from the group consisting of monochlorobenzene, dichlorobenzene and α-chloronaphthalene, thereby adding maleic anhydride to the polymer.

* * * * *